Aug. 22, 1961  W. E. RICHESON, JR., ET AL  2,997,651
PULSE AMPLITUDE MEASURING CIRCUIT
Filed Jan. 10, 1958

Inventors:
William E. Richeson, Jr.
James A. Blake,
by Gust & Irish
Their Attorneys.

United States Patent Office 2,997,651
Patented Aug. 22, 1961

2,997,651
PULSE AMPLITUDE MEASURING CIRCUIT
William E. Richeson, Jr., Fort Wayne, Ind., and James A. Blake, Dayton, Ohio, assignors to International Telephone & Telegraph Corporation
Filed Jan. 10, 1958, Ser. No. 708,125
1 Claim. (Cl. 324—103)

This invention relates to voltage measurement apparatus and more particularly to a circuit for measuring the amplitude of narrow voltage pulses.

There are instances in the design of electronic circuitry where it is desirable to measure the amplitude of extremely narrow voltage pulses. In the past, such amplitude measurements have been made by utilizing the forward conduction characteristic of a semi-conductor diode device, such forward conduction characteristic depending upon current flow due to the majority carriers in the device. Such prior pulse amplitude measuring circuits were, however, not sufficiently fast acting since in utilizing the forward conduction characteristic of semi-conductor diodes, charge carrier storage was required to be built up before conduction and dissipated after conduction. It is therefore desirable to provide a circuit for accurately measuring the amplitude of extremely narrow pulses which is faster acting than prior circuits for making such measurements. It is further desirable that such a circuit have a low value of forward impedance, a high value of reverse impedance, low shunting capacitance, and most importantly low inertia transition into or out of the conducting and non-conducting states.

We have found that an extremely fast acting circuit for accurately measuring the amplitude of extremely narrow pulses may be provided by utilizing the reverse breakdown or avalanche characteristic of a semi-conductor diode. Thus, our invention in its broader aspects provides semi-conductor diode means with means for applying a reverse voltage thereacross to back-bias the diode means to a point at or adjacent the avalanche breakdown point of the diode means, and means are provided for applying the voltage pulse, the amplitude of which is to be measured, across the diode means, thereby to cause an avalanche breakdown of the diode means. Energy storage means, such as a capacitor, is connected in circuit with the diode means in the path of the current flow due to the avalanche breakdown with voltage measuring means being provided connected in circuit with the energy storage means.

It is therefore desirable to provide an improved circuit for measuring the amplitude of narrow voltage pulses.

Another object of this invention is to provide an improved circuit for accurately measuring the amplitude of narrow voltage pulses having faster action than that provided by prior circuits for making such measurement.

A further object of this invention is to provide an improved circuit for accurately measuring the amplitude of narrow voltage pulses characterized by its low forward impedance, high reverse impedance, low shunting capacitance, and low inertia transition into and out of the conducting and non-conducting states.

The above-mentioned and other features and objects of this invention and the manner of attaining them will become more apparent and the invention itself will be best understood by reference to the following description of an embodiment of the invention taken in conjunction with the drawings, wherein.

Figure 1:
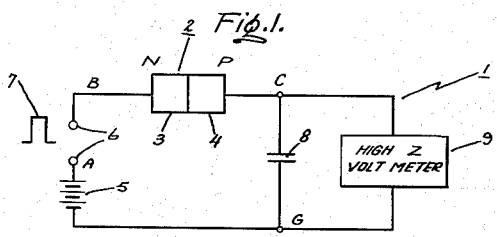
FIG. 1 is a simplified schematic illustration illustrating the principles of our invention.

Referring now to FIG. 1, there is shown a circuit, generally identified as 1 including a semi-conductor junction diode 2 having an N-type region 3 and a P-type region 4, as is well known in the art. A source of unidirectional voltage, shown here as a battery 5, is provided serially connected with a pair of input terminals 6 adapted to have a narrow voltage pulse 7, the amplitude of which is to be measured, impressed thereacross. A capacitor 8, unidirectional voltage source 5 and input terminals 6 are serially connected across the semi-conductor diode 2. A high impedance voltage measuring device 9 is connected across the capacitor 8 as shown.

A conventional semi-conductor junction diode, as is well known in the art, is formed of semi-conductor crystal material, such as silicon, having two regions designated as N-type and P-type; the P-type region has impurities added to the basic crystalline material, these impurities providing a surplus of positive charge carriers or holes, while the N-type region has impurities added thereto which provide a plurality of negative charge carriers or electrons. These positive and negative charge carriers due to the major impurities in the P and N-type regions respectively are referred to as majority carriers. In the region of the junction between the P-type and N-type regions of the semi-conductor diode, the positive charge carriers of the P-type region tend to migrate toward the N-type region and conversely, the negative charge carriers in the N-type region tend to migrate toward the P-type region, due respectively to the density differential between the P and N-type regions. When the positive charge carriers leave the P-type region, they leave negative charge and likewise when the negative charge carriers leave the N-type region, they leave positive charge, thus producing a plurality of positive charge at the boundary of the N-type region and a plurality of negative charge at the boundary of the P-type region. The region of the junction between the P and N-type regions is therefore an insulator layer or a layer depleted of all charge with the positive charge on the boundary of the N-type region and the negative charge on the boundary of the P-type region, in essence establishing a field between the two regions; this layer depleted of charge is therefore referred to as the depletion region.

In addition to the majority charge carriers referred to above, so-called minority carriers are present in the semi-conductor diode which may come from two sources. The first source of minority charge carriers are minority impurities in the P and N-type regions of the semi-conductor material, these impurities respectively providing charge carriers of the opposite polarity from the majority charge carriers produced by the major impurities. The second source of minority charge carriers is the so-called hole electron pairs which in turn are caused by thermal disturbance of the crystal lattice; at absolute zero temperature, there will be no thermal activity in the crystal and thus no hole electron pairs created. However, as the temperature of the crystal is increased, the thermal energy is sufficient to cause the molecular bonds of the crystal to be broken releasing hole electron pairs, each having a positive charge or hole and a negative charge or electron. In the P-type region, the positive charge or holes from the hole electron pairs act in the same manner as the positive majority charge carriers and tend to migrate toward the N-type region and likewise in the N-type region, the electrons from the hole electron pairs tend to migrate toward the P-type region, i.e. on the respective sides of the depletion region, only half of each hole electron pair migrates toward the other region, the other half combine and are cancelled by majority carriers present. However, in the depletion region, the movement of the respective positive and negative charges of the hole electron pairs is in a direction to reduce the field established by the majority charge carriers, i.e. the electrons from the hole electron pairs migrate toward the positive charge area at the boundary of the N-type region whereas the positive charges or holes migrate toward the negative charge area at the boundary of the P-type region, thus tending to discharge the field.

If now a source of unidirectional potential is connected across the diode polarized in a direction to tend to cause current flow in a direction reversed from the normal direction of current flow in the forward direction through the diode, i.e. with the positive side connected to the N-type region and the negative side connected to the P-type region, this reverse potential, referred to as a back-bias voltage, aids the field set up by the majority carriers thus increasing the width of the depletion region and in turn the insulation provided thereby; the provision of a back-bias voltage across the diode thus increases the backward impedance of the device, this backward impedance including capacitive reactance as well as resistance, the capacitance however being substantially reduced from its value without the application of the back-bias voltage to the diode. The application of the reverse or back-bias voltage to the diode causes a reverse current to flow into the diode due to the minority carriers however, the minority carriers are produced at a certain rate depending upon the temperature of the diode and the minority impurities and thus, once the minority carriers are completely utilized in the flow of reverse current, a current saturation condition is obtained after which no substantial additional current flow is provided due to increased back-bias voltage; any increase in back-bias voltage beyond the condition of current saturation is caused by leakage current such as surface leakage.

As the reverse or back-bias voltage is increased, the field established at the junction between the P-type and N-type regions becomes progressively higher, this increased field causing the minority carriers to bombard the crystal lattice with increased energy. At a finite value of reverse or back-bias voltage, the minority carriers will have acquired sufficient energy from the high field caused by the back-bias voltage to cause what is referred to as avalanche breakdown of the semi-conductor; this avalanche breakdown is analogous to an arc discharge, and thus under this condition, the semi-conductor diode becomes a very high conductance, low impedance element; whereas the backward impedance of the device may have been for example 20,000 megohms before breakdown, the backward impedance may be on the order of 1 to 100 ohms after breakdown. As soon as the back-bias voltage which caused the avalanche breakdown is removed however, the diode very rapidly returns to its original condition, the charge carriers rapidly dissipating due to the high density of the breakdown region. It is thus seen that the semi-conductor diode experiences extremely rapid recovery following avalanche breakdown after removal of the back-bias potential which brought about the breakdown, the device not having suffered any physical damage by virtue of the breakdown if the breakdown does not exceed a certain power dissipation level.

Figure 2:
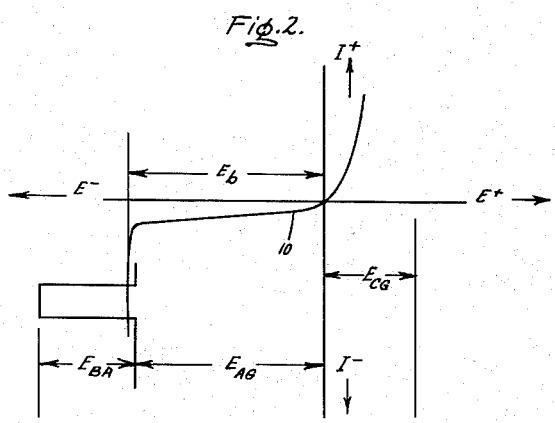
FIG. 2 is an illustration showing the characteristics of the circuit of FIG. 1.

Referring now to FIG. 2 in addition to FIG. 1, the reverse voltage at which the diode 2 will experience avalanche breakdown is shown as voltage $E_b$ and the source of back-bias voltage 5 is adjusted so that the resulting back-bias voltage designated $E_{AG}$ is just at or slightly less than the avalanche breakdown voltage $E_b$. Thus, when the narrow voltage pulse 7 having an amplitude $E_{ba}$ and which is polarized in the same direction as the back-bias voltage $E_{AG}$ is applied across the input terminals 6, the pulse voltage is superimposed or added to the back-bias voltage $E_{AG}$ thus carrying the reverse voltage applied across the diode 2 beyond the avalanche breakdown point so that avalanche breakdown occurs and the diode 2 becomes a very high conductance element. Reference to FIG. 2 will show that with positive voltages applied across the diode 2, i.e. when the positive side of the potential source is connected to the P-type region and the negative side to the N-type region, positive or normal direction current flows in the diode as shown. However, with a reverse or back-bias voltage applied, reverse current flows in the negative direction, as explained above, the current rapidly reaching a maximum due to saturation of charge carriers as a function of reverse potential, as indicated at point 10 at which point the slope of the reverse current characteristic becomes much less with any subsequent increase in current responsive to greater back-bias voltage being merely due to leakage current, such as surface leakage. When the avalanche potential $E_b$ has been reached, however, the diode 2 breaks down and the negative current therethrough increases very rapidly in the nature of an arc discharge. Referring now additionally to FIG. 1, this reverse current flow due to avalanche breakdown in diode 2 flows through capacitor 8; the flow of reverse current through capacitor 8 charges the capacitor 8, the magnitude of the charge in capacitor 8 being proportional to the amplitude of the voltage pulse, designated $E_{BA}$ in FIG. 2 beyond the avalanche breakdown point. When the applied pulse $E_{BA}$ disappears, the semi-conductor diode 2 returns to its low conductance state thus opening the current path of the capacitor 8 and leaving the stored pulse amplitude across capacitor 8, designated as $E_{CG}$ in FIG. 2. This stored energy and thus the amplitude of the applied pulse $E_{BA}$ can be measured by means of a high impedance voltmeter connected across capacitor 8, as at 9 of FIG. 1.

It will now be seen that the ability of the circuit of FIG. 1 to detect extremely narrow voltage pulses is due to three major effects. The first effect is the reduction of junction capacity of the semi-conductor diode 2 due to the spread of the depletion region responsive to the application of the back-bias voltage. As explained above, the depletion region becomes an electrical insulator and as such provides the dielectric for the junction capacity. Since the depletion region spreads or widens with increasing back-bias, the conduction region is spread apart, thus reducing the junction capacity or conversely increasing its capacitive reactance. The second effect is the extremely high switching impedance ratio obtainable with the circuit of FIG. 1; the reverse or back-bias causes the junction impedance to become extremely high, i.e. on the order of 2,000 megohms, whereas when avalanche breakdown occurs, the junction impedance becomes extremely low and the conductance of the device extremely high, the impedance after breakdown being less than 10 ohms. The third effect is due to the fact that at the point of avalanche breakdown, current flows due to an avalanche effect initiated by a very small percentage of minority charge carriers. The bulk of the avalanche current is carried by charge carriers made available within the depletion layer by bombardment in the nature of an arc discharge, however, once the back-bias is removed, the charge carriers immediately fall back into the immediate crystal lattice from whence they came. It is thus seen that in the circuit of FIG. 1, no charge carrier storage is required to be built up before conduction and dissipated after conduction, as was the case with prior circuits utilizing the forward conduction characteristic of semi-conductor diodes for the measurement of false amplitudes. The above effects make possible an extremely fast acting pulse amplitude measuring device possessing the desired characteristics of low forward impedance, high reverse impedance, low shunting capacitance and low inertia transition into and out of the conducting and non-conducting states.

Figure 3:
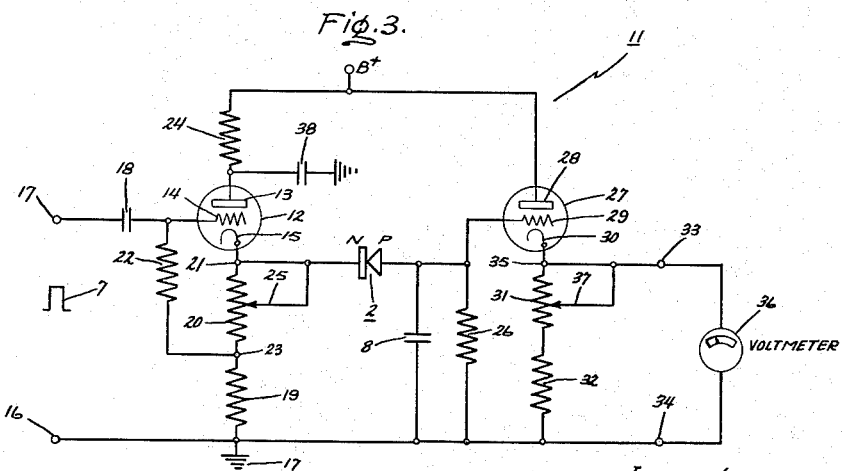
FIG. 3 is a schematic illustration showing an actual circuit incorporating our invention.

Referring now to FIG. 3 there is shown a circuit 11 which incorporates our invention. Here, since it is desired that the driving impedance of the semi-conductor diode be low, a cathode follower connection is used for the input. Thus, an input vacuum tube 12 is provided having a plate 13, a grid 14 and a cathode 15. A pair of input terminals 16 and 17 are provided adapted to be connected to a source (not shown) of the pulses 7, the amplitude of which is to be measured. Input terminal 17 is connected to the grid 14 of the tube 12 by a coupling capacitor 18 while the other input terminal 16, which may be connected to ground 17 as shown, is connected to cathode 15 of tube 12 by means of serially connected resistors 19 and 20 as shown. The N-type region of the diode 2 is connected to cathode 15 of tube 12 as at 21 and a bias for the grid 14 of tube 12 is provided by means of a grid resistor 22 connected between grid 14 and point 23 intermediate cathode resistors 19 and 20 as shown. Plate 13 is connected to a suitable source of plate potential such as 150 volts, by means of a suitable plate resistor 24. It is thus seen that with no input pulse 7 applied across the input terminals 16 and 17, and with resistor 22 suitably chosen, cathode-to-plate current will flow in tube 12 of sufficient magnitude to provide a sufficient voltage drop across the cathode resistors 19 and 20 to provide the desired back-bias voltage $E_{AG}$ on the diode 2; an adjustable tap 25 on resistor 20 is provided as shown in order to suitably adjust the exact value of the back-bias voltage $E_{AG}$. It will now be seen that by virtue of the cathode follower connection of the input tube 12 to the semi-conductor diode 2, a low impedance is provided for charging the capacitor 8, which it will be seen is connected across the N-type region of the diode 2 and ground 17.

In order to provide a high impedance to prevent the charge on capacitor 8 from leaking off too rapidly, a resistor 26 is provided connected in parallel with capacitor 8, the resistor 26 and capacitor 8 jointly providing an integrating circuit. An output tube 27 is provided having a plate 28, grid 29 and cathode 30, the plate 28 being connected to the same source of plate potential as the input tube 12. Grid 29 of the tube 27 is connected to the P-type region of the semi-conductor diode 2, as shown, with the cathode 30 being connected to ground 17 by means of serially connected cathode resistors 31 and 32. Output terminals 33 and 34 are respectively connected to the cathode 30 as at 35 and to ground 17 as shown, and thus provide an output circuit connected across the cathode resistors 31 and 32. Output terminals 33 and 34 may be connected to any suitable voltage measuring device, such as a conventional voltmeter 36 with calibration being provided by means of adjustable tap 37 of the cathode resistor 31.

In a typical circuit constructed in accordance with FIG. 3 above for measuring the amplitude of pulses 7 having a duration of .03 microsecond and having a maximum peak voltage of 8 volts, elements having the following values were utilized:

| | | |
|---|---|---|
| Capacitor 18 | microfarads | .01 |
| Resistor 22 | ohms | 100,000 |
| Resistor 24 | do | 10,000 |
| Capacitor 38 | microfarads | .1 |
| Tubes 12 and 27 | | 12 AT 7 |
| Resistor 20 | ohms | 10,000 |
| Resistor 19 | do | 4,700 |
| Diode 2 | | IN203 |
| Capacitor 8 | microfarads | .01 |
| Resistor 26 | megohms | 10 |
| Resistor 31 | ohms | 500 |
| Resistor 32 | do | 1,000 |

It will now be seen that we have provided a circuit for measuring the amplitude of extremely short voltage pulses which, in contrast with prior circuits known to the applicant which utilized the forward conduction characteristic of semi-conductor diodes, uses the reverse avalanche breakdown characteristic of semi-conductor diodes thus providing an extremely fast acting device having the desired low forward impedance, high reverse impedance, low shunting capacitance and low inertia transition.

While we have described above the principles of our invention in connection with specific apparatus, it is to be clearly understood that this description is made only by way of example and not as a limitation to the scope of our invention.

What is claimed is:

A circuit for measuring the amplitude of a narrow voltage pulse comprising: a semi-conductor junction diode having an N-type and a P-type region; an input vacuum tube having cathode, grid and plate elements; a cathode resistor connected to said cathode; said diode having its N-type region connected to said cathode; said grid being biased so that normal cathode current flow provides a voltage drop across said cathode resistor; an input circuit connected across said grid and cathode resistor and adapted to be connected to a source of unidirectional voltage pulses whereby said voltage pulses are added to said cathode resistor voltage drop; an integrating circuit comprising a capacitor and a resistor respectively connected across the P-type region of said diode and said cathode resistor; an output vacuum tube having cathode, grid and plate elements, said output tube grid element being connected to said diode P-type region; a cathode resistor connected across said output tube cathode and said integrating circuit; and an output circuit connected across said output tube cathode resistor and adapted to be connected to voltage measuring means; said input tube cathode resistor voltage drop providing a back-bias voltage across said diode slightly less than the avalanche breakdown voltage thereof, said voltage pulses causing avalanche breakdown of said diode with the current responsive thereto charging said capacitor, said integrating circuit resistor and output tube providing a high impedance across said capacitor whereby the charge stored in said capacitor may be measured thereby to determine the amplitude of said voltage pulses.

References Cited in the file of this patent

UNITED STATES PATENTS

| | | |
|---|---|---|
| 2,498,335 | Hunt | Feb. 21, 1950 |
| 2,708,736 | Creveling et al. | May 17, 1955 |
| 2,714,702 | Shockley | Aug. 2, 1955 |
| 2,734,169 | Douma | Feb. 7, 1956 |

OTHER REFERENCES

Article by Ryerson et al., published in Electronics, September 1945, pages 110 and 111.